US011932229B2

(12) United States Patent
Van Thiel

(10) Patent No.: US 11,932,229 B2
(45) Date of Patent: Mar. 19, 2024

(54) ELECTRONICALLY CONTROLLABLE BRAKING SYSTEM HAVING TWO FALL-BACK LEVELS

(71) Applicant: ZF CV Systems Hannover GmbH, Hannover (DE)

(72) Inventor: Julian Van Thiel, Grossburgwedel (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 443 days.

(21) Appl. No.: 17/438,480

(22) PCT Filed: Mar. 4, 2020

(86) PCT No.: PCT/EP2020/055666
§ 371 (c)(1),
(2) Date: Sep. 13, 2021

(87) PCT Pub. No.: WO2020/187569
PCT Pub. Date: Sep. 24, 2020

(65) Prior Publication Data
US 2022/0144232 A1 May 12, 2022

(30) Foreign Application Priority Data
Mar. 15, 2019 (DE) .................... 10 2019 106 591.7

(51) Int. Cl.
*B60T 8/94* (2006.01)
*B60T 8/17* (2006.01)
(Continued)

(52) U.S. Cl.
CPC .............. *B60T 8/94* (2013.01); *B60T 8/1708* (2013.01); *B60T 8/176* (2013.01); *B60T 8/885* (2013.01);
(Continued)

(58) Field of Classification Search
CPC . B60T 8/94; B60T 8/176; B60T 8/885; B60T 8/1708; B60T 13/268; B60T 13/683; B60T 2270/413
(Continued)

(56) References Cited

U.S. PATENT DOCUMENTS 10,730,499 B2   8/2020   Otremba
11,052,892 B2   7/2021   Dieckmann et al.
(Continued)

FOREIGN PATENT DOCUMENTS

CN   107750215 A   3/2018
CN   109195844 A   1/2019
(Continued)

*Primary Examiner* — Christopher P Schwartz
(74) *Attorney, Agent, or Firm* — LEYDIG, VOIT & MAYER, LTD.

(57) ABSTRACT

An electronically controllable braking system for a vehicle is provided. The electronically controllable braking system includes a service brake sub-system and a redundancy brake sub-system. The service brake sub-system includes a front axle service brake circuit with front axle service brakes and a rear axle service brake circuit with rear axle service brakes. The redundancy brake sub-system includes a front axle redundancy brake circuit and a rear axle redundancy brake circuit. A service brake control module is configured to generate a service brake control signal in dependence upon a braking specification for generating a front axle service brake pressure. A redundancy brake control module is configured to generate a redundancy brake control signal in dependence upon a braking specification for generating a front axle redundancy brake pressure.

26 Claims, 8 Drawing Sheets

(51) Int. Cl.
*B60T 8/176* (2006.01)
*B60T 8/88* (2006.01)
*B60T 13/26* (2006.01)
*B60T 13/68* (2006.01)

(52) U.S. Cl.
CPC .......... *B60T 13/268* (2013.01); *B60T 13/683* (2013.01); *B60T 2270/413* (2013.01)

(58) Field of Classification Search
USPC ................................................ 303/123, 127
See application file for complete search history.

(56) References Cited

U.S. PATENT DOCUMENTS

| | | | |
|---|---|---|---|
| 11,130,481 B2 | 9/2021 | Wulf | |
| 11,180,127 B2* | 11/2021 | Farres | B60T 15/027 |
| 11,370,404 B2* | 6/2022 | Michaelsen | B60T 13/683 |
| 2018/0334150 A1 | 11/2018 | Palomba et al. | |
| 2019/0118786 A1 | 4/2019 | Wulf | |
| 2020/0023820 A1 | 1/2020 | Van Thiel | |

FOREIGN PATENT DOCUMENTS

| | | | |
|---|---|---|---|
| DE | 102015008377 A1 | 12/2016 | |
| DE | 102015011296 A1 | 3/2017 | |
| DE | 102016005318 A1 | 11/2017 | |
| DE | 102016010463 A1 | 3/2018 | |
| DE | 102017002716 A1 | 9/2018 | |
| DE | 102017113743 A1 | 12/2018 | |
| EP | 1571061 A1 | 9/2005 | |
| EP | 2090481 B1 | 11/2013 | |
| EP | 3626560 A1 | 3/2020 | |
| EP | 3626562 A1 | 3/2020 | |
| WO | WO-2018172233 A1 * | 9/2018 | .............. B60T 13/66 |
| WO | 2019210960 A1 | 11/2019 | |

* cited by examiner

ELECTRONICALLY CONTROLLABLE BRAKING SYSTEM HAVING TWO FALL-BACK LEVELS

CROSS-REFERENCE TO PRIOR APPLICATIONS

This application is a U.S. National Phase application under 35 U.S.C. § 371 of International Application No. PCT/EP2020/055666, filed on Mar. 4, 2020, and claims benefit to German Patent Application No. DE 10 2019 106 591.7, filed on Mar. 15, 2019. The International Application was published in German on Sep. 24, 2020 as WO 2020/187569 under PCT Article 21(2).

FIELD

The disclosure relates to an electronically controllable braking system, in particular an electronically controllable pneumatic braking system, for a vehicle, in particular a commercial vehicle, at least comprising a service brake sub-system having a front axle service brake circuit with front axle service brakes, a rear axle service brake circuit with rear axle service brakes, and a service brake control module, wherein there can be supplied to the front axle service brakes a front axle service brake pressure and to the rear axle service brakes a rear axle service brake pressure, and the service brake control module is configured to generate a service brake control signal in dependence upon a braking specification, wherein the front axle and rear axle service brake pressure can be generated in dependence upon the service brake control signal and specified to the front axle and rear axle service brakes for the implementation, under the electrical control of the service brake control module, of the braking specification via the front axle service brake circuit and the rear axle service brake circuit. The disclosure relates further to a vehicle and to a method for controlling an electronically controllable braking system of the type mentioned at the beginning.

BACKGROUND

A braking system in a vehicle, preferably a commercial vehicle, can be provided with two or more service brake circuits, in which a service-brake brake pressure outputted to service brakes is regulated, and a parking brake circuit, in which a parking-brake brake pressure outputted to spring brakes is regulated. The outputting of the service-brake brake pressure to the service brakes is effected, for example, via a pressure modulator which outputs a service-brake brake pressure to the service brakes in question in accordance with a service brake braking specification in the form of a pneumatic service brake control pressure or an electrical service brake control signal.

In normal operation, the specification to the pressure modulator takes place electrically via the service brake control signal, wherein the service brake control signal is determined and outputted by a service brake control module in dependence upon a manually specified service brake braking specification and/or in dependence upon an assistance braking specification requested in an automated manner by an assistance system. In the redundancy case, for example in the event of an electrical failure of the service brake control module, the specification to the pressure modulator frequently takes place in known braking systems via the service brake control pressure, which is specified to the pressure modulator via a pneumatic redundancy port and which is outputted, for example, by a service brake operation device which is in the form of an electro-pneumatic service brake valve and has a brake pedal, in dependence upon the service brake braking specification.

The parking brake circuit serves primarily for parking the vehicle in a parking situation or for performing auxiliary braking or emergency braking while the vehicle is moving in that, under the control of a parking brake control module, a parking-brake brake pressure is outputted, in dependence upon which the spring brakes are applied, wherein the parking-brake brake pressure is reduced for the application. Such a parking brake control module is described by way of example in DE 10 2015 008 377 A1. The parking brake circuit and the service brake circuits conventionally work separately from one another. In some applications it is possible to replace the redundancy mechanism of the service brake outlined above by the alternative actuation of the parking brake circuit. To this end, the supply of electric power to the parking brake must usually take place independently of the supply of power to the service brake.

In the event of a failure of the electrical actuation of the service brake circuits via the service brake control module, a pneumatic first fall-back level controlled by the driver can be formed, as described. However, if the driver is not available as a fall-back level because, for example, he is not paying attention or, in the case of more highly automated driving maneuvers, is not in position, a second fall-back level which is able to take action in an automated and electronically controlled manner can be formed, wherein the existing parking brake circuit is used for this purpose. Following detection of the electrical failure in one of the service brake circuits, the automated braking requirement is supplied to the parking brake control module which, by specifying the parking-brake brake pressure, is able to correspondingly operate the spring brakes in order to compensate for the electrical failure of the service brakes. Alternatively, the automated braking requirement can be supplied to the parking brake control module permanently and, on detection of a failure in at least one of the service brake circuits by the parking brake control module, the parking brake control module can correspondingly operate the spring brakes by specifying the parking-brake brake pressure. In some circumstances, however, only one vehicle axle, on which the spring brakes in the parking brake circuit are arranged, is braked in this case. This can lead to a limited deceleration capacity and optionally to additional instabilities while the vehicle is moving.

In order to avoid this, EP 2 090 481 B1 describes an electronically controllable braking system in which a rear axle service brake circuit is controlled by a rear axle service brake control module and a front axle service brake circuit is controlled by a front axle service brake control module. The parking brake control module for the parking brake circuit is integrated in the front axle service brake control module, wherein the parking brake circuit controls spring brakes on the rear axle. The rear axle service brake control module and the components of the rear axle service brake circuit are supplied with energy by a first energy source, and the front axle service brake control module and the parking brake control module with the correspondingly associated components are supplied with energy by a second energy source.

In the event of a failure of the first energy source, that is to say the rear axle service brake circuit with the service brakes on the rear axle, the front axle can be braked further via the front axle service brake circuit and the rear axle can be braked via the parking brake circuit, so that both vehicle axles can continue to be braked. The parking brake circuit thus compensates for the failure of the rear axle service brake circuit in that braking is carried out at the rear axle by the spring brakes instead of by the service brakes. In the event of a failure of the second energy source, that is to say both of the parking brake circuit at the rear axle and of the front axle service brake circuit, a service brake control signal is transmitted by the rear axle service brake control module, which signal is transmitted to the rear axle pressure modulator—as in normal operation—but additionally also to a trailer control valve of the vehicle. A corresponding control pressure is generated by the trailer control valve, which control pressure is transmitted to the trailer—if present—in order to effect braking there, and at the same time also via a redundancy pressure line to the pneumatic redundancy port at the front axle pressure modulator. The rear axle and the front axle are thus—as in normal operation—braked via the service brakes, wherein the front axle is likewise controlled by the rear axle service brake control module.

The parking brake control module can further output a parking brake control pressure to the trailer control valve, which inverts it and forwards it to the service brakes of the trailer in order to allow a parking brake function to be implemented in the trailer too.

It is thus proposed in the prior art to control each service brake circuit via separate control modules and to compensate for a failure of an energy source, and thus of at least one service brake circuit, in that the still functioning brake circuit(s) undertake(s) braking at the failed vehicle axle, so that both vehicle axles can still be used for braking even in the redundancy case.

This has the disadvantage that, in electronically controlled braking systems which control the service brakes at the rear axle and the front axle, and optionally further vehicle axles, via the pressure modulator via only a central service brake control module, such compensation cannot take place, since, in the event of a failure of the energy source or of individual electrical components of the service brake circuit in question, the central service brake control module can no longer undertake the electrical actuation of the service brakes, or of the pressure modulators upstream thereof, at individual vehicle axles. It is thus possible only to switch to the pneumatic driver-controlled first fall-back level—if present in the corresponding braking system—if the driver actually also manually takes action. A purely electronic braking specification as is described in EP 2 090 481 B1, or a possible assistance braking specification specified in an automated manner, can, however, no longer be implemented.

There is further known from DE 10 2015 011 296 A1 an electronically controllable pneumatic braking system which comprises: at least one brake circuit, wherein in the at least one brake circuit brake pressures at service brakes can be regulated independently of one another, wherein there is associated with the at least one brake circuit for this purpose at least one control valve. The at least one control valve has an electronic control input for receiving an electrical control signal and a pneumatic control input for receiving a control pressure. In dependence upon the control signal or the control pressure, the at least one control valve supplies the service brakes of the at least one brake circuit with brake pressure via working ports. A first control unit is provided for transmitting the control signals in dependence upon a target vehicle deceleration for the electrical actuation of the at least one control valve, wherein the target vehicle deceleration can be specified by a first brake valve. The first brake valve specifies a first brake valve control pressure to the at least one brake circuit. The braking system further has a second brake valve for outputting a second brake valve control pressure, which second brake valve is arranged in the pneumatic braking system such that the first brake valve control pressure of the first brake valve and/or the second brake valve control pressure of the second brake valve is outputted as control pressure to the at least one control valve for the pneumatic actuation of the at least one control valve, wherein the second brake valve is electronically actuatable if electrical actuation of the at least one control valve is prevented in order to form an electronically pneumatically controlled redundancy. In this example, the two control valves thus mutually replace one another in order to produce the redundancy.

A similar system is disclosed in DE 10 2016 005 318 A1. The braking system disclosed therein again has at least two brake circuits, wherein there is associated with at least one of the at least two brake circuits an electrically and pneumatically controllable control valve and with a further of the at least two brake circuits an electrically controllable parking brake valve, for specifying brake pressures for actuating wheel brakes of the brake circuit in question. A first control unit is provided, which first control unit is configured to electrically actuate the control valve in question in dependence upon a target vehicle deceleration that is requested in an automated manner or in dependence upon a driver-specified operation via an operating device. A second control unit is provided, which second control unit is configured to electrically control the parking brake valve in dependence upon the target vehicle deceleration that is requested in an automated manner, if electrical actuation of the control valve in question is prevented, in order to form an electronically pneumatically controlled redundancy. There is further provided at least one bypass valve associated with a control valve, which bypass valve is configured to pneumatically actuate the associated control valve if the pneumatic actuation takes place in dependence upon the target vehicle deceleration requested in an automated manner or in dependence upon the driver-specified operation of the operating device, if electrical actuation of the control valve in question is prevented, in order to enhance the electronically pneumatically controlled redundancy.

A problem here is that all these systems are aimed primarily at a residual availability in the case of single faults, in order to bring the vehicle into a safe state. They are generally not suitable for allowing the vehicle to travel onwards to its destination.

SUMMARY

In an embodiment, the present disclosure provides an electronically controllable braking system for a vehicle. The electronically controllable braking system includes a service brake sub-system and a redundancy brake sub-system. The service brake sub-system includes a front axle service brake circuit with front axle service brakes, a rear axle service brake circuit with rear axle service brakes, and a service brake control module. The service brake control module is configured to generate a service brake control signal in dependence upon a braking specification. A front axle service brake pressure supplied to the front axle service brakes and a rear axle service brake pressure supplied to the rear axle service brakes are generated in dependence upon the service brake control signal under the electrical control of the service brake control module. The redundancy brake sub-system includes a front axle redundancy brake circuit, a rear axle redundancy brake circuit, and a redundancy brake control module. The redundancy brake control module is configured to generate a redundancy brake control signal in dependence upon a braking specification. A front axle redundancy brake pressure supplied to the front axle service brakes and a rear axle redundancy brake pressure supplied to the rear axle service brakes are generated in dependence upon the redundancy brake control signal under the electrical control of the redundancy brake control module.

Accordingly, the object of embodiments of the present disclosure provide, with as little outlay as possible, a resulting residual availability and robustness of the braking system for single faults in the braking system, which allows the vehicle to travel onwards, preferably as far as, for example, its original destination or alternatively to a repair shop. These systems, where possible, are to have no negative effects on the performance and robustness of the service brake system.

The embodiments achieve the object in an electronically controllable braking system of the type mentioned at the beginning in that it has a redundancy sub-system having a front axle redundancy brake circuit, a rear axle redundancy brake circuit, and a redundancy brake control module, wherein there can be supplied to the front axle service brakes a front axle redundancy brake pressure and to the rear axle service brakes a rear axle redundancy brake pressure, and the redundancy brake control module is configured to generate a redundancy brake control signal in dependence upon a braking specification, wherein the front axle and rear axle redundancy brake pressure can be generated in dependence upon the redundancy brake control signal and specified to the front axle and rear axle service brakes for the implementation, under the electrical control of the redundancy brake control module, of the braking specification via the front axle redundancy brake circuit and the rear axle redundancy brake circuit.

BRIEF DESCRIPTION OF THE DRAWINGS

The embodiments of the present disclosure will be described in even greater detail below based on the exemplary figures. The embodiments are not limited to the exemplary embodiments. Other features and advantages of various embodiments of the present disclosure will become apparent by reading the following detailed description with reference to the attached drawings which illustrate the following.

DETAILED DESCRIPTION

Figure 1:
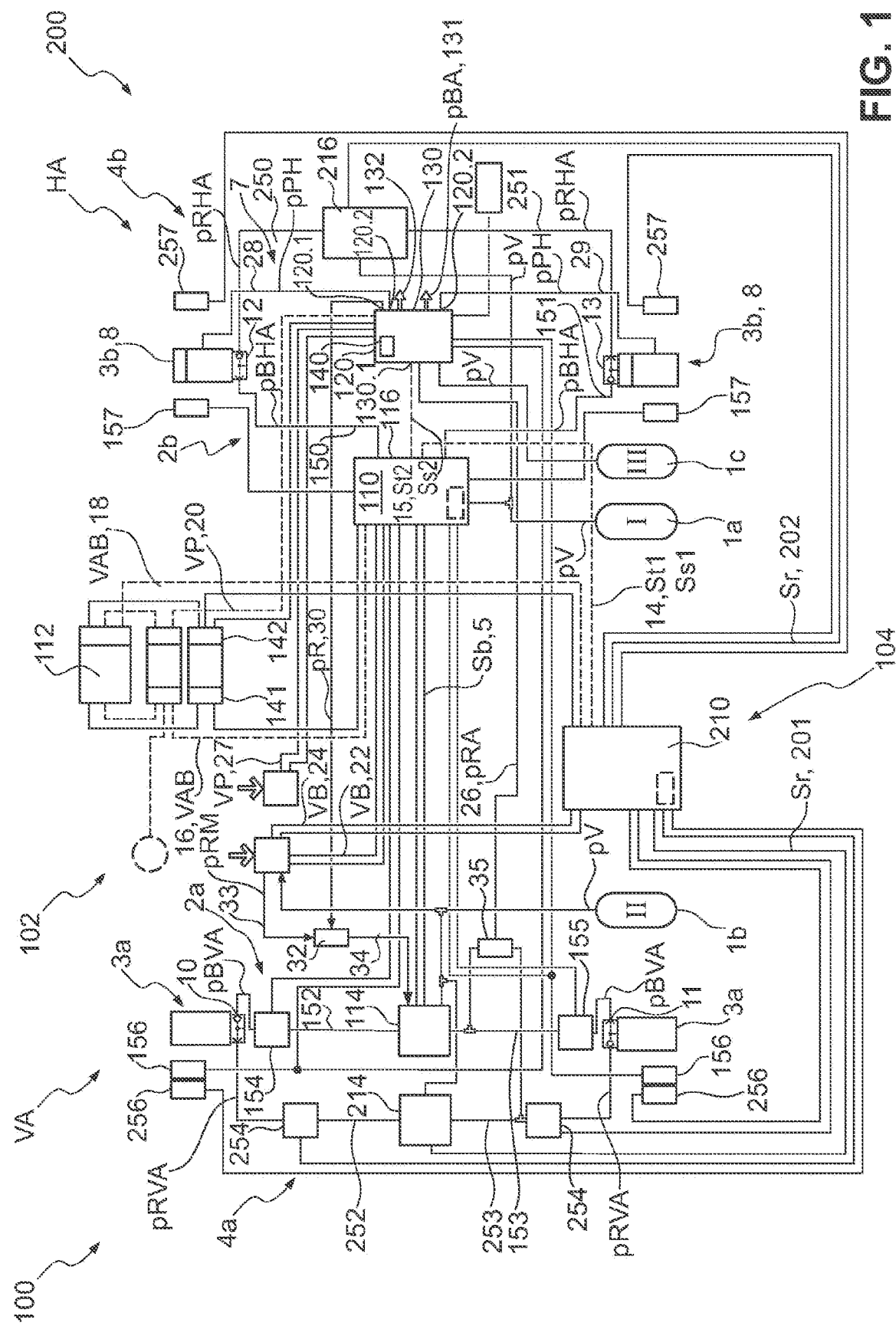
FIG. 1 shows a first exemplary embodiment of an electronically controllable braking system.

The residual availability and robustness of the braking system can be increased by constructing, parallel to the service brake sub-system, a redundancy brake sub-system which can take over in the event of failure of the service brake sub-system. Both the service brake sub-system and the redundancy brake sub-system thereby act upon the same brake actuators, namely the front axle service brakes and the rear axle service brakes. The redundancy brake sub-system can be controlled entirely by the redundancy brake control module, which is preferably independent of all the control units of the service brake sub-system. The redundancy brake control module is preferably configured to monitor the service brake sub-system continuously and to take over immediately in the event of a fault. The redundancy brake sub-system preferably has its own pressure modulators and is thus capable of achieving wheel-specific regulation and also of implementing an anti-lock braking system (ABS) and/or electronic stability control (ESC) functions. There is preferably further implemented a third fall-back level, as is known, for example, in the prior art.

In a first preferred embodiment, the rear axle service brake circuit and the rear axle redundancy brake circuit are connected to a first compressed air reservoir, and the front axle service brake circuit and the front axle redundancy brake circuit are connected to a second compressed air reservoir. This means that separate compressed air reservoirs are provided for the service brake circuit and for the redundancy brake circuit. Alternatively, it can be provided that the rear axle service brake circuit and the front axle redundancy brake circuit are connected to a first compressed air reservoir, and the front axle service brake circuit and the rear axle redundancy brake circuit are connected to a second compressed air reservoir. In this variant, the two compressed air reservoirs are connected crosswise, so that in each case both compressed air reservoirs, the first compressed air reservoir and the second compressed air reservoir, are used both in the service case and in the redundancy case. In this manner, a higher volume overall can be provided. Protection against failure of one of the reservoirs can thereby also be achieved at least rudimentarily.

The electronically controllable braking system preferably further comprises a parking brake circuit having spring brakes, wherein there can be supplied to the spring brakes a parking-brake brake pressure, wherein the parking-brake brake pressure can be generated in dependence upon the braking specification and specified to the spring brakes for the implementation of the braking specification via the parking brake circuit. This parking brake circuit is preferably connected to a third compressed air reservoir. The parking brake circuit can be configured in the conventional manner, and the braking specification to be implemented via the parking brake circuit can be, for example, the signal of a parking brake switch, a signal of a higher-level unit for applying the parking brakes, or a signal for using the parking brakes as auxiliary brakes.

In order to access the same service brakes by means of the two different sub-systems, it can be provided that the front axle service brake circuit and the front axle redundancy brake circuit are connected via first and second shuttle valves to the corresponding front axle service brakes, such that in each case the higher of the front axle service brake pressure and the front axle redundancy brake pressure is outputted to the front axle service brakes. In the same manner, the rear axle service brake circuit and the rear axle redundancy brake circuit can be connected via third and fourth shuttle valves to the corresponding rear axle service brakes, such that in each case the higher of the rear axle service brake pressure and the rear axle redundancy brake pressure is outputted to the rear axle service brakes. In this manner, the redundancy sub-system can override the pressure outputted by the service brake sub-system, and safe braking is possible even in the event of failure of the service brake sub-system.

Alternatively, it can be provided that the front axle service brakes have a front axle service brake cylinder and a redundant front axle brake cylinder, wherein the front axle service brake circuit is connected to the front axle service brake cylinder and the front axle redundancy brake circuit is connected to the redundant front axle brake cylinder. In the same manner, it can also be provided for the rear axle that the rear axle service brakes have a rear axle service brake cylinder and a redundant rear axle brake cylinder, wherein the rear axle service brake circuit is connected to the rear axle service brake cylinder and the rear axle redundancy brake circuit is connected to the redundant rear axle brake cylinder. In such a case, the above-mentioned shuttle valves may be omitted. However, in this embodiment, special brake cylinders which include the service brake cylinder and the redundant brake cylinder are necessary.

It is preferably provided that the service brake control module and the redundancy brake control module are connected to one another via a first status line for transmitting a first status signal, and the redundancy brake control module is adapted, in the case where electrically controlled implementation of the braking specification via the front axle service brake circuit and/or the rear axle service brake circuit is prevented by the service brake control module, to receive a first fault signal from the service brake control module via the first status line and/or is adapted to detect a fault in the case where the first status signal is absent. The first status signal can be a conventional signal of the service brake control module, which signal is received by the redundancy brake control module and indicates a functionality of the service brake control module. Examples thereof may be simple signals for the switching of one or more solenoid valves, which signals are transmitted by the service brake control module for the implementation of the braking specification. If implementation of the braking specification by the service brake control module is not possible, it is conceivable that the service brake control module transmits a fault signal. According to this embodiment, such a fault signal is then provided via the first status line, so that the redundancy brake control module can take over. An absence of the first status signal can also be interpreted as a fault, which is detected by the redundancy brake control module, so that the redundancy brake control module takes over. The redundancy brake control module is preferably adapted to verify and/or check the plausibility of the detection of a fault of the service brake control module via a further communication path, for example a vehicle bus.

Preferably, the service brake control module is connected via a first vehicle bus to a unit for autonomous driving and the redundancy brake control module is connected via a second vehicle bus to the unit for autonomous driving for receiving the braking specification. In normal operation, both the service brake control module and the redundancy brake control module thus receive the braking specification from the unit for autonomous driving, so that the redundancy brake control module can immediately take over in the event of a fault of the service brake control module. However, it can also be provided that the unit for autonomous driving transmits the braking specification to the redundancy brake control module only when the redundancy brake control module has already taken over.

The electronically controllable braking system preferably further comprises a brake signal transmitter for providing a manual braking specification, wherein the brake signal transmitter is connected by a first brake signal transmitter line to the service brake control module and by a second brake signal transmitter line to the redundancy brake control module. In this manner, the redundancy brake control module can receive and implement signals from the brake signal transmitter independently of the functioning of the service brake control module, provided that the redundancy brake control module has taken over control. The first and second brake signal transmitter lines are preferably electrical brake signal transmitter lines. Pneumatic lines can additionally also be provided.

It is further preferred that the service brake sub-system has a service front axle modulator, connected to the service brake control module, and a service rear axle modulator, which modulators are configured to receive the service brake control signal and to output the front axle or rear axle service brake pressure. The redundancy brake sub-system preferably has a redundancy front axle modulator, connected to the redundancy brake control module, and a redundancy rear axle modulator, which modulators are configured to receive the redundancy brake control signal and to output the front axle or rear axle redundancy brake pressure. In addition to the redundant control modules, the braking system according to the present embodiment thus also has redundant axle modulators, which are used when the redundancy brake sub-system is to replace the service brake sub-system. It is thus possible with this system to compensate not only for faults in the service brake control module but also for faults in the service front axle modulator or the service rear axle modulator. The residual availability and robustness of the braking system are thereby increased further.

It can further be provided in such an embodiment that the service brake sub-system has first and second ABS valves, which are arranged in each case between the service brake front axle modulator and the corresponding front axle service brake. The redundancy brake sub-system preferably also has first and second redundant ABS valves, which are arranged in each case between the redundancy front axle modulator and the corresponding front axle service brake. In addition, it can be provided in embodiments that the redundancy brake sub-system has third and fourth redundant ABS valves for the rear axle redundancy brake circuit. In this manner, a wheel-specific ABS function can also be implemented when the service brake sub-system has failed and the redundancy brake sub-system takes over. The robustness is increased further.

In embodiments in which the electronically controllable braking system comprises a parking brake circuit, it preferably further has a parking brake module which is configured to control the parking brake circuit, wherein the parking brake module outputs the parking brake pressure in dependence upon the receiving of a parking brake braking specification. The parking brake module is thus a separate module which is provided independently of the service brake control module and the redundancy brake control module. It preferably has its own intelligence and a separate power supply.

The service brake control module and the parking brake module are preferably connected to one another via a second status line, and the parking brake module is adapted, in the event of a fault, to receive a second fault signal from the service brake control module via the second status line and/or is adapted to detect a fault in the case where the first status signal is absent. The parking brake module is further preferably configured, in dependence upon the receiving of the second fault signal or the absence of the first status signal, to provide a redundant control pressure for the front axle service brake circuit and/or the front axle redundancy brake circuit. The redundant control pressure is preferably outputted at the service front axle modulator or the redundancy front axle modulator. A third fall-back level is thus formed, in which the parking brake module preferably takes over control. If both the service brake control module and the redundancy brake control module fail, control of the braking system is carried out in this third fall-back level via the parking brake module. For this purpose, the parking brake module on the one hand actuates the spring brakes at the rear axle, in order to use them as redundant service brakes. On the other hand, the control pressure for the front axle is outputted at the same time and, according to the fault, provided either to the service front axle modulator or to the redundancy front axle modulator. The redundant control pressure is preferably based on the inverse parking brake pressure, that is to say the pressure that is provided at the spring brakes by the parking brake module. A further modulation of this pressure is also conceivable.

In order to implement this functionality, the parking brake module preferably has an inverter control valve with a redundancy output, wherein the inverter control valve is configured to generate a redundant control pressure and to output it via the redundancy output, wherein the redundant control pressure is inversely proportional to the parking-brake brake pressure, wherein the front axle service brake pressure can be outputted at the front axle service brakes of the front axle service brake circuit in dependence upon the redundant control pressure specified by the inverter control valve, if implementation of the braking specification, under the electrical control of the redundancy brake control module, via the front axle service brake circuit and/or the front axle redundancy brake circuit is prevented. It is thus possible to achieve the advantage that, in the event of an electrical failure in both sub-systems, the service brake sub-system and the redundancy brake sub-system, as a result of which neither the service-brake brake pressure nor the redundancy-brake brake pressure can be fixed in dependence upon an electrically specifiable service brake control signal, or an electrically controlled implementation of a specific braking specification by the service brake sub-system or the redundancy brake sub-system can no longer take place, a braking specification specified to the parking brake circuit can be redirected via the inverter control valve to the front axle service brake circuit. In the event of an electrical failure of the service brake sub-system and the redundancy brake sub-system, the braking specification specified to the parking brake circuit is not necessarily also implemented by the spring brakes in the parking brake circuit. It can, for example, also be provided that, in the event of such an electrical failure, only the parking-brake brake pressure and/or the parking brake control pressure and/or a control pressure associated therewith is generated in the parking brake circuit, but a transmission, or implementation, of these pressures via the spring brakes is prevented and these pressures are merely redirected via the inverter control valve to the front axle service brake circuit or the front axle redundancy brake circuit in order to be able to implement the braking specification specified to the parking brake circuit in the front axle service brake circuit or front axle redundancy brake circuit and thus compensate for the electrical failure in the service brake sub-system or redundancy brake sub-system in a simple manner.

The electronically controllable braking system further preferably comprises a trailer control module which is provided for outputting a trailer brake pressure. The trailer control module can be integrated with the parking brake module, in particular have a common housing and in particular a common controller.

In a preferred embodiment it is provided that the service brake control module and the trailer control module are connected to one another via a second status line, and the trailer control module is adapted, in the event of a fault, to receive a second fault signal from the service brake control module via the second status line and/or is adapted to detect a fault in the case where the second status signal is absent. The trailer control module is further preferably configured, in dependence upon the receiving of the second fault signal and/or the absence of the second status signal, to provide a redundant control pressure for the front axle service brake circuit and/or the front axle redundancy brake circuit. Thus, in this case, the trailer control module takes over the outputting of the redundant control pressure and thus the redundant outputting of the brake pressures at the front axle. The same remarks as made above in relation to the parking brake module preferably apply here. According to the configuration of the braking system it can be advantageous to allocate this functionality either to the parking brake module or to the trailer control module or to a common combined module.

In such an embodiment it is preferably provided that the trailer control module is connected to a trailer redundancy pressure line into which in each case the higher of the front axle service brake pressure and the front axle redundancy brake pressure is outputted as the trailer redundancy pressure, wherein the trailer control module is configured, in dependence upon the receiving of the second fault signal and/or in the absence of the second status signal, to output the trailer redundancy pressure as the trailer brake pressure. In this manner, the trailer can be braked concomitantly likewise redundantly, in this case preferably pneumatically redundantly, in the case where electronic outputting is not possible. The residual availability and robustness are increased further.

The braking system preferably further comprises a first power source, a second power source and a third power source, wherein the first power source is connected to the service brake control module, the second power source is connected to the redundancy brake control module, and the third power source is connected to the parking brake module and/or to the trailer control module. In this manner it is ensured that each redundancy level, namely the service brake sub-system, the redundancy brake sub-system and the parking brake module or trailer control module, is connected to its own power supply. In this manner too, the residual availability and the robustness are increased further.

In a further aspect, the various embodiments may achieve the object mentioned at the beginning in a vehicle, in particular a commercial vehicle, by means of an electronically controllable braking system according to one of the preferred embodiments described above of an electronically controllable braking system according to the first aspect of the disclosure.

In a third aspect of the disclosure, the object mentioned at the beginning is achieved by a method for controlling an electronically controllable braking system according to one of the preferred embodiments described above of an electronically controllable braking system according to the first aspect of the disclosure, comprising the steps: determining whether the braking specification can be implemented via the front axle service brake circuit and/or the rear axle service brake circuit under the electrical control of the service brake control module; if implementation of the braking specification via the front axle service brake circuit and/or the rear axle service brake circuit under the electrical control of the service brake control module is prevented: determining whether the braking specification can be implemented via the front axle redundancy brake circuit and/or the rear axle redundancy brake circuit under the electrical control of the redundancy brake control module, and if implementation of the braking specification via the front axle redundancy brake circuit and/or the rear axle redundancy brake circuit under the electrical control of the redundancy brake control module is not prevented: outputting of the front axle and rear axle redundancy brake pressure, in dependence upon the redundancy brake control signal generated by the redundancy brake control module, to the front axle and rear axle service brakes for the implementation of the braking specification via the front axle redundancy brake circuit and the rear axle redundancy brake circuit under the electrical control of the redundancy brake control module. It will be appreciated that the electronically controllable braking system according to the first aspect of the invention and the method for controlling an electronically controllable braking system according to the second aspect of the invention have the same or similar sub-aspects, as are set forth in particular in the dependent claims. In this respect, reference is made for preferred embodiments and the advantages thereof to the above description in its entirety.

In a preferred refinement of the method, the method comprises the following steps: providing a first status signal by the service brake control module to the redundancy brake control module; and in the case where an electrically controlled implementation of the braking specification via the front axle service brake circuit and/or the rear axle service brake circuit is prevented by the service brake control module: providing a first fault signal by the service brake control module, and receiving the first fault signal at the redundancy brake control module; and/or detecting a fault of the service brake control module in the case where the first status signal is absent. The status signal can be a conventional signal which is generated in the processing of the braking specification in the service brake control module. The redundancy brake control module monitors the service brake control module, and to that end receives the first status signal. The first status signal can be transmitted regularly, for example at specific intervals or during specific operations. If electrically controlled implementation of the braking specification via the front axle service brake circuit and/or the rear axle service brake circuit is prevented by the service brake control module, for example because the service brake control module has a fault, the service brake control module in a variant provides a fault signal, which is then received by the redundancy brake control module. Should the service brake control module fail directly, for example because the fault constitutes a failure of the power supply, the first status signal is generally absent in another variant. As a result of the absence of the first status signal, the redundancy brake control module detects according to this embodiment a fault of the service brake control module on the basis of the absence of the status signal.

In both cases, or also independently thereof, it is preferred that an assistance braking specification is received at the service brake control module via a first vehicle BUS from the unit for autonomous driving, and the assistance braking specification is received at the redundancy brake control module via a second vehicle BUS from the unit for autonomous driving. Both modules, the service brake control module and the redundancy brake control module, thus receive the assistance braking specification and are able to implement it. If a fault as described above is then determined, the redundancy brake control system preferably takes over and implements the assistance braking specification.

It is further preferred that the method comprises: receiving a parking braking specification at the parking brake module and outputting a parking brake pressure, preferably by means of the parking brake module. In the case where electrically controlled implementation of the braking specification via the front axle service brake circuit and/or the rear axle service brake circuit is prevented by the service brake control module: providing the second fault signal by the service brake control module to the parking brake module and/or detecting a fault of the service brake control module in the case where the second status signal is absent; and outputting a redundant control pressure for the front axle service brake circuit and/or the front axle redundancy brake circuit by the parking brake module in dependence upon the receiving of the second fault signal or of the detected fault by the parking brake module. It can also be provided that the second status signal and the second fault signal are provided by the redundancy brake control module, and in this respect the parking brake module is connected to the redundancy brake control module. The second status signal and the second fault signal would in this case be transmitted only if the redundancy brake control module has already taken over and the braking system is thus working in the second level, that is to say the first redundancy level.

In a variant, in accordance with some embodiments, the trailer control module can also perform this functionality.

The method preferably further comprises the steps: receiving in each case the higher of the front axle service brake pressure and the front axle redundancy brake pressure as the trailer redundancy pressure via a trailer redundancy pressure line at the trailer control module; and outputting the trailer redundancy pressure as the trailer brake pressure. In this manner it is possible that the trailer is also concomitantly redundantly braked if there is a fault in the braking system which prevents normal outputting of the trailer brake pressure.

Embodiments of the disclosure will now be described below on the basis of the drawings. The drawings are not necessarily intended to illustrate the embodiments to scale; rather, the drawings are of schematic and/or slightly distorted form where expedient for explanatory purposes. With regard to additions to the teaching that emerges directly from the drawings, reference is made to the relevant prior art. Note here that numerous modifications and changes regarding the form and the detail of an embodiment may be made without departing from the general concept of the invention. The features of the embodiments disclosed in the description, in the drawings, and in the claims may be essential to the refinement of the embodiments both individually and in any desired combination. Furthermore, the scope of the disclosure encompasses all combinations of at least two of the features disclosed in the description, in the drawings, and/or in the claims. The general concept disclosed herein is not restricted to the exact form or the detail of the preferred embodiments shown and described below, or restricted to subject matter which would be restricted in relation to the subject matter claimed in the claims. Where dimensional ranges are stated, it is also the intention that values lying within the stated limits are disclosed, and can be used and claimed as desired, as limit values.

FIG. 1 first shows a first exemplary embodiment of an electronically controllable braking system 100 for a vehicle 200, in particular a commercial vehicle 200. The braking system 100 has a service brake sub-system 102 and a redundancy brake sub-system 104 which can replace the service brake sub-system 102 in the event of a fault thereof.

The braking system 100 has a first compressed air reservoir 1a, a second compressed air reservoir 1b, and a third compressed air reservoir 1c. A front axle service brake circuit 2a is fed by the second compressed air reservoir 1b. A rear axle service brake circuit 2b for the rear axle HA of the vehicle 200 is fed by the first compressed air reservoir 1a. Associated with the front axle service brake circuit 2a are front axle service brakes 3a, and associated with the rear axle service brake circuit 2b are rear axle service brakes 3b. The braking system 100 additionally has a front axle redundancy brake circuit 4a, which in this exemplary embodiment is fed, like the front axle service brake circuit 2a, by the second compressed air reservoir 1b. In a corresponding manner, the braking system 100 has a rear axle redundancy brake circuit 4b, which in this exemplary embodiment is fed by the first compressed air reservoir 1a. The third compressed air reservoir 1c is associated with a parking brake circuit 7, which acts on spring brakes 8 at the rear axle HA, which here are integrated with the rear axle service brakes 3b. The parking brake circuit 7 will be described in greater detail below.

For controlling the braking system 100, the braking system first has a service brake control module 110 which is connected via a first vehicle BUS 16 to a unit for autonomous driving 112 and thus receives via the first vehicle BUS 16 a braking specification, more specifically an assistance braking specification VAB. The service brake control module 110 implements this braking specification VAB and for this purpose transmits a service brake control signal SB via a first electrical line 5 to a service front axle modulator 114. In the same manner, a service rear axle modulator 116, which in this exemplary embodiment is integrated with the service brake control module 110, also receives the service brake control signal SB. The service rear axle modulator 116 receives supply pressure pV from the first compressed air reservoir 1a and outputs corresponding rear axle service brake pressures pBHA at the rear axle service brakes 3b. For this purpose, the service brake rear axle modulator 116 is connected via first and second rear axle service brake pressure lines 150, 151 to the corresponding rear axle service brakes 3b. In a corresponding manner, the service front axle modulator 114 receives supply pressure pV from the second compressed air reservoir 1b and outputs front axle service brake pressures pBVA via first and second front axle service brake lines 152, 153 and first and second front axle ABS modules 154, 155 to the corresponding front axle service brakes 3a. More specifically, the first and second front axle service brake lines 152, 153 are connected to first and second shuttle valves 10, 11, which are connected upstream of the front axle service brakes 3a. In a similar manner, third and fourth shuttle valves 12, 13 are also connected upstream of the rear axle service brakes 3b, so that the first and second rear axle service brake lines 150, 151 are connected to these third and fourth shuttle valves 12, 13.

The braking system 100 further comprises a brake signal transmitter BST which is connected on the one hand to the service brake sub-system 102 and on the other hand to the redundancy brake sub-system 104. The brake signal transmitter BST is first connected via a first brake signal transmitter line 22, which is of twin-wire form, to the service brake control module 110, to which it provides a braking specification, namely a service braking specification VB, which can be outputted, for example manually, via the brake signal transmitter BST. The service brake signal SB can also be provided on the basis of this braking specification VB. The service brake control module 110 is connected to a first power source 141.

The redundancy brake sub-system 104 has a redundancy brake control module 210, which is able to undertake substantially the same functions as the service brake control module 110. The redundancy brake control module 210 is connected via a second vehicle BUS 118 to the unit for autonomous driving 112 and receives therefrom a braking specification, namely the assistance braking specification VAB. It can be provided that the redundancy brake control module 210 receives the assistance braking specification VAB only when the redundancy brake control module 210 is active. The redundancy brake control module 210 is further connected to the brake signal transmitter BST, namely via a second brake signal transmitter line 24, which is likewise of twin-wire form, and thus receives the service braking specification VB. In order to supply power to the redundancy brake control module 210, it is connected to a second power source 142.

In this exemplary embodiment, the redundancy brake sub-system 104 further has a redundancy front axle modulator 214 and a redundancy rear axle modulator 216. The redundancy front axle modulator 214 is connected via a second electrical line 201 to the redundancy brake control module 210 and receives therefrom a redundancy brake control signal SR. Similarly, the redundancy rear axle modulator 216 is connected via a third electrical line 202 to the redundancy brake control module 210 and likewise receives the redundancy brake control signal SR therefrom. Furthermore, the redundancy brake front axle modulator 214 is connected to the second compressed air reservoir 1b and receives supply pressure pV therefrom. Similarly, the redundancy rear axle modulator is connected to the first compressed air reservoir 1a and receives supply pressure pV therefrom.

The redundancy front axle modulator 214 is connected via first and second front axle redundancy brake lines 252, 253 and first and second redundant front axle ABS modules 254, 255 to the first and second shuttle valves 10, 11. The redundancy front axle modulator 214 thereby provides a front axle redundancy brake pressure pRVA to the first and second shuttle valves 10, 11. The first and second shuttle valves 10, 11 are so designed that in each case the higher of the front axle service brake pressure pBVA and the front axle redundancy brake pressure pRVA is forwarded to the front axle service brakes 3a.

Similarly, the redundancy rear axle modulator 216 is connected via first and second rear axle redundancy brake lines 250, 251 to the third and fourth shuttle valves 12, 13 and provides the rear axle redundancy brake pressure pRHA thereto. The third and fourth shuttle valves 12, 13 are also so designed that in each case the higher of the rear axle service brake pressure pBHA and the rear axle redundancy brake pressure pRHA is forwarded to the rear axle service brakes 3b.

For monitoring the service brake control module 116, the redundancy brake control module 210 is connected via a first status line 14 to the service brake control module 110. The redundancy brake control module 210 receives via this first status line 14 a first status signal SS1 from the service brake control module 110, which indicate normal operation of the service brake control module 110. Such a first status signal SS1 can be, for example, a signal provided therefor, which is transmitted at specific time intervals. It can also be a conventional signal which is outputted by the service brake control module 110, for example in order to switch solenoid valves of the service brake control module 110. It can also be a signal derived from the service brake signal SB.

In the case where the service brake sub-system 102 has a fault, for example in the service brake control module 110, it can be provided that the service brake control module 110 provides a first fault signal ST1 via the first status line 14. It can also be provided that the redundancy brake control module 210 itself detects this fault if the first status signal SS1 is not received or is not correctly received for a predetermined period of time. In this case, the redundancy brake control module 210 preferably takes over control of the braking system 100, namely via the redundancy brake sub-system 104. The braking system 100 is then working in the first redundancy level, which is the second level of the braking system 100. The service brake control module 210 transmits the redundancy brake control signal SR, and the redundancy front and rear axle brake pressures pRVA, pRHA are consequently outputted via the redundancy front axle and rear axle modulators 214, 216. Those brake pressures can then be provided to the corresponding front and rear axle service brakes 3a, 3b via the first, second, third and fourth shuttle valves 10, 11, 12, 13.

In order to increase the robustness further, the redundancy brake sub-system 102 in this exemplary embodiment (as depicted in FIG. 1) has redundant front axle wheel sensors 256 and redundant rear axle wheel sensors 257, which are each connected to the redundancy brake control module 210. These redundant wheel sensors 256, 257 measure, for example, the speed and/or wear at the corresponding wheels of the front axle VA and rear axle HA and replace wheel sensors 156, 157 of the service brake sub-system 102. In this exemplary embodiment, the redundancy brake sub-system 104 is thus a completely redundant braking system with which full redundant control of the front and rear axles VA/HA is possible.

The braking system 100 further has in the parking brake circuit 7 a parking brake module 120. The parking brake module 120 is connected to the third compressed air reservoir 1c and receives supply pressure pV therefrom. The parking brake module 120 is on the one hand connected via a third vehicle BUS 20 to the unit for autonomous driving 120 and receives therefrom a braking specification VP, namely a parking brake braking specification VP. Alternatively or in addition, the parking brake module 120 can also receive the parking brake braking specification VP from a parking brake switch HCU to which the parking brake module 120 is connected via a parking brake switch line 27. The parking brake module 120 further has two parking brake ports 120.2 to which there are connected spring brake pressure lines 28, 29, which are connected to spring brakes 8 at the rear axle HA. Via the spring brake ports 120.2, the parking brake module 120 is able to output a parking brake pressure pPH. The parking brake module 120, like the redundancy brake control module 210, is connected to the second power source 142.

The parking brake module 120 further has a redundancy output 120.1 to which a first redundancy pressure line 30 is connected. A redundancy pressure pR can be outputted into this first redundancy pressure line 30 by the parking brake module 120, for the redundant outputting of the front axle service brake pressures pBVA and/or front axle redundancy brake pressures pRVA. In the embodiment (as depicted in FIG. 1), a second redundancy level can thus be produced via the parking brake module 120, for the event that the service brake control module 110 and/or the redundancy brake control module 210 fail. For this purpose, the first redundancy pressure line 30 leads to the service front axle modulator 114, in this exemplary embodiment more specifically first to a select high valve 32, which is likewise connected at its second input to a second redundancy pressure line 33 which is connected to the brake signal transmitter BST. Via the brake signal transmitter BST, a manual redundancy pressure pRM can be outputted into the second redundancy pressure line 33. The first select high valve 32 then lets the higher of the manually outputted redundancy pressure pRM and the redundancy pressure pR through and outputs it into a third redundancy pressure line 34, which in turn is then connected to the service front axle modulator 114, which is then correspondingly able to implement the outputted redundancy pressure. For this purpose, the service brake front axle modulator 114 has corresponding pneumatic and/or electro-pneumatic valves, which are not shown here. In the simplest case, the service front axle modulator 114 outputs to the front axle service brakes 3a an equivalent pressure, which increases the redundant pressure outputted at the service front axle modulator, in the form of redundantly outputted front axle service brake pressure pBVA or front axle redundancy brake pressure pRVA.

The parking brake module 120 has an inverter control valve 140 which inverts the pressure outputted by the parking brake module 120 to the spring brakes 8 and outputs it as redundancy pressure pR at the redundancy output 120.1.

The parking brake module 120 is further connected via a second status line 15 to the service brake control module 110 and receives via that line a second status signal Ss2. It can additionally receive a second fault signal St2 in the case where the service brake control module 110 or the redundancy brake control module 210 fails. If both the service brake control module 110 and the redundancy brake control module 210 have failed, the parking brake module 120 can redundantly brake both the rear axle HA by providing corresponding parking brake pressures pPH to the spring brakes 8, which are then in this case used for redundant service braking. The front axle VA can also concomitantly be redundantly braked via the redundancy pressure pR which is outputted at the redundancy output 120.1.

In the exemplary embodiment shown in FIG. 1, the braking system 100 further comprises a trailer control module 130, which is here integrated in a common module together with the parking brake module 120. The trailer control module 130 has a trailer brake pressure port 131 and a trailer supply pressure port 132, which are also referred to as the yellow and red coupling head. The trailer control module 130 serves to output the trailer brake pressure pBA in order to brake the trailer concomitantly.

In order also to carry out braking of the trailer redundantly in the event that the trailer control module 130 has a fault, the trailer control module 130 has a trailer redundancy port 130.1, the trailer redundancy port 130.1 is connected to a trailer redundancy pressure line 26 into which a trailer redundancy pressure pRA can be outputted. The trailer redundancy pressure line 26 is connected to a second select high valve 35, which is connected by its outputs on the one hand to the second front axle service brake line 153 and on the other hand to the second front axle redundancy brake line 253. However, it could likewise be connected to the first front axle service brake line 152 or the first front axle redundancy brake line 252, or to corresponding ports at the service front axle modulator 114 or the redundancy front axle modulator 214. It is important that on the one hand the front axle service brake pressure pBVA and on the other hand the front axle redundancy brake pressure pRVA are outputted at the two ports of the second select high valve 35. The higher of the front axle service brake pressure pBVA and the front axle redundancy brake pressure pRVA is thus always outputted into the trailer redundancy pressure line 26 as the trailer redundancy pressure pRA, so that it is possible to output the trailer redundancy pressure pRA irrespective of whether the braking system 100 is working in the operating state with the service brake sub-system 102 or in the first redundancy level with the aid of the redundancy brake sub-system 104. In the event that the trailer control module 130 fails, the trailer brake pressure pBA can thus be redundantly outputted in that a pressure is tapped at the front axle VA and outputted directly or with increased volume at the trailer brake pressure port 131.

Figure 2:
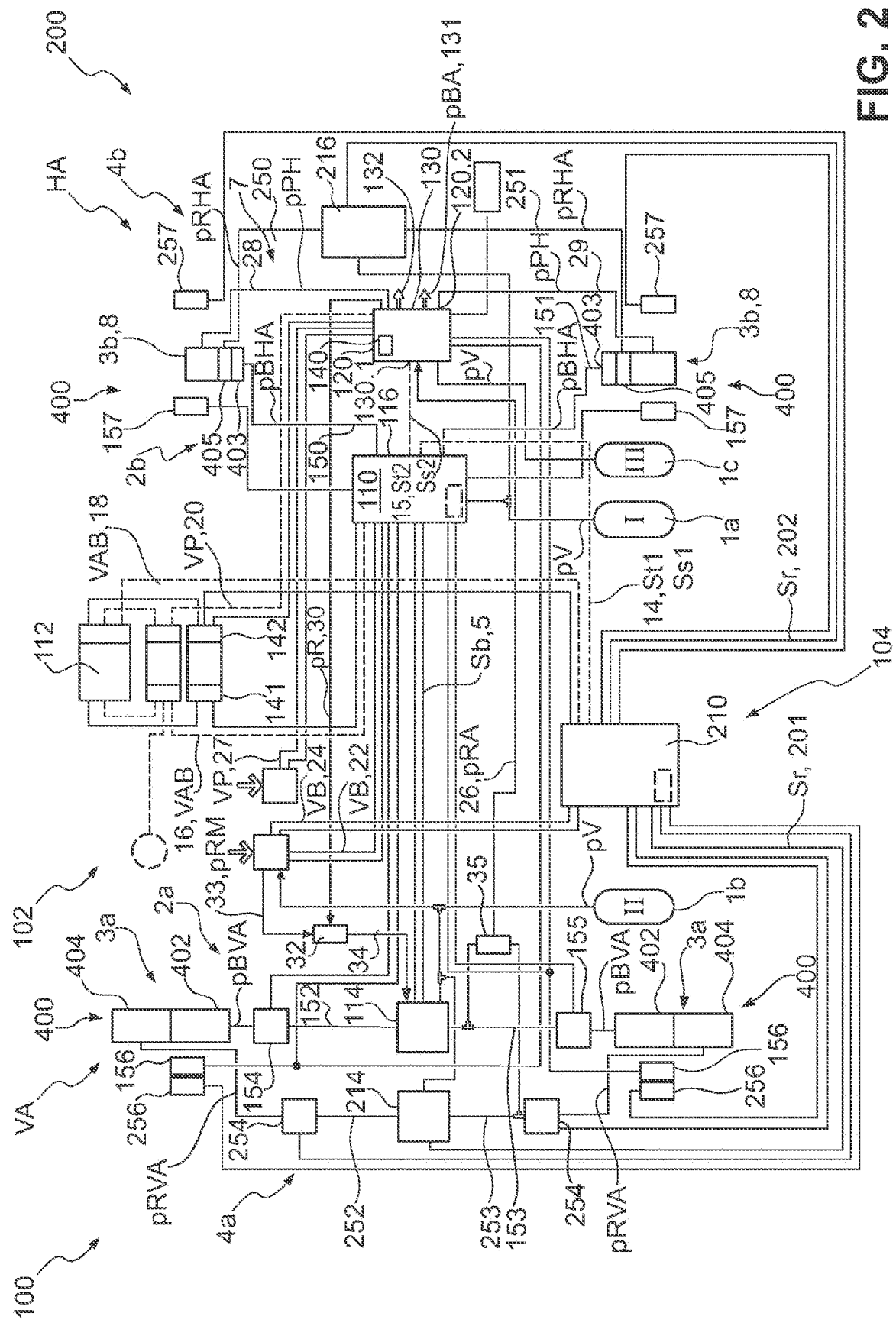
FIG. 2 shows a second exemplary embodiment of an electronically controllable braking system.
Figure 6:
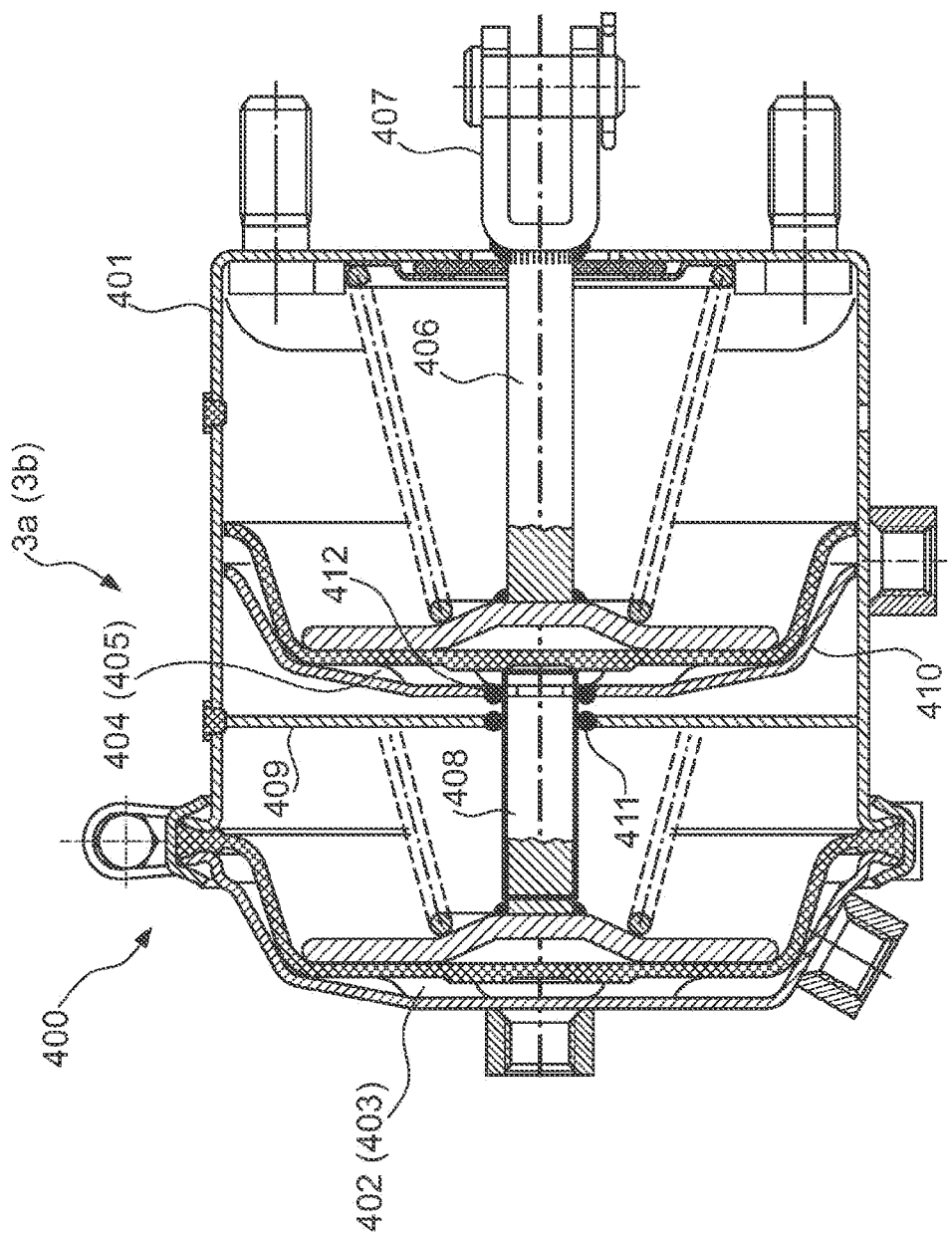
FIG. 6 shows a cross section through service brakes according to an exemplary embodiment.

FIG. 2 shows a second exemplary embodiment, which is based on the first exemplary embodiment (as depicted in FIG. 1). The fundamental difference is that first, second, third and fourth shuttle valves 10, 11, 12, 13 for the front axle service brakes 3*a* and rear axle service brakes 3*b* are not provided as in the first exemplary embodiment; rather, in the second exemplary embodiment, a particular type of brake cylinder is used, as is shown in detail in FIG. 6. These twin brake cylinders (as depicted in FIG. 6) can be used as the front axle service brakes 3*a* or rear axle service brakes 3*b*. They have a front axle service brake cylinder 402 and rear axle service brake cylinder 403 (generally designated service brake cylinder 402 for the sake of simplicity). They further have a redundant front axle brake cylinder 404 and a redundant rear axle brake cylinder 405 (generally designated redundant brake cylinder 404 for the sake of simplicity). The redundant brake cylinder 404 acts via a rod 406 on an articulated element 407 which is arranged outside the housing 401. On application of pressure into the redundant brake cylinder 404, the rod 406 moves to the right with reference to FIG. 6. The service brake cylinder 402 acts on a second rod 408, which is guided through a diaphragm 409 and a cover 410 of the redundant brake cylinder 404 and is sealed at the diaphragm and the cover by means of two gaskets 411, 412. Thus, when the service brake cylinder 402 moves to the right with reference to FIG. 6, the second rod 408 presses against the redundant brake cylinder 404 and likewise pushes it to the right. The redundant brake cylinder 404 is thus carried by the service brake cylinder 402 and mechanically moved to the right.

Figure 3:
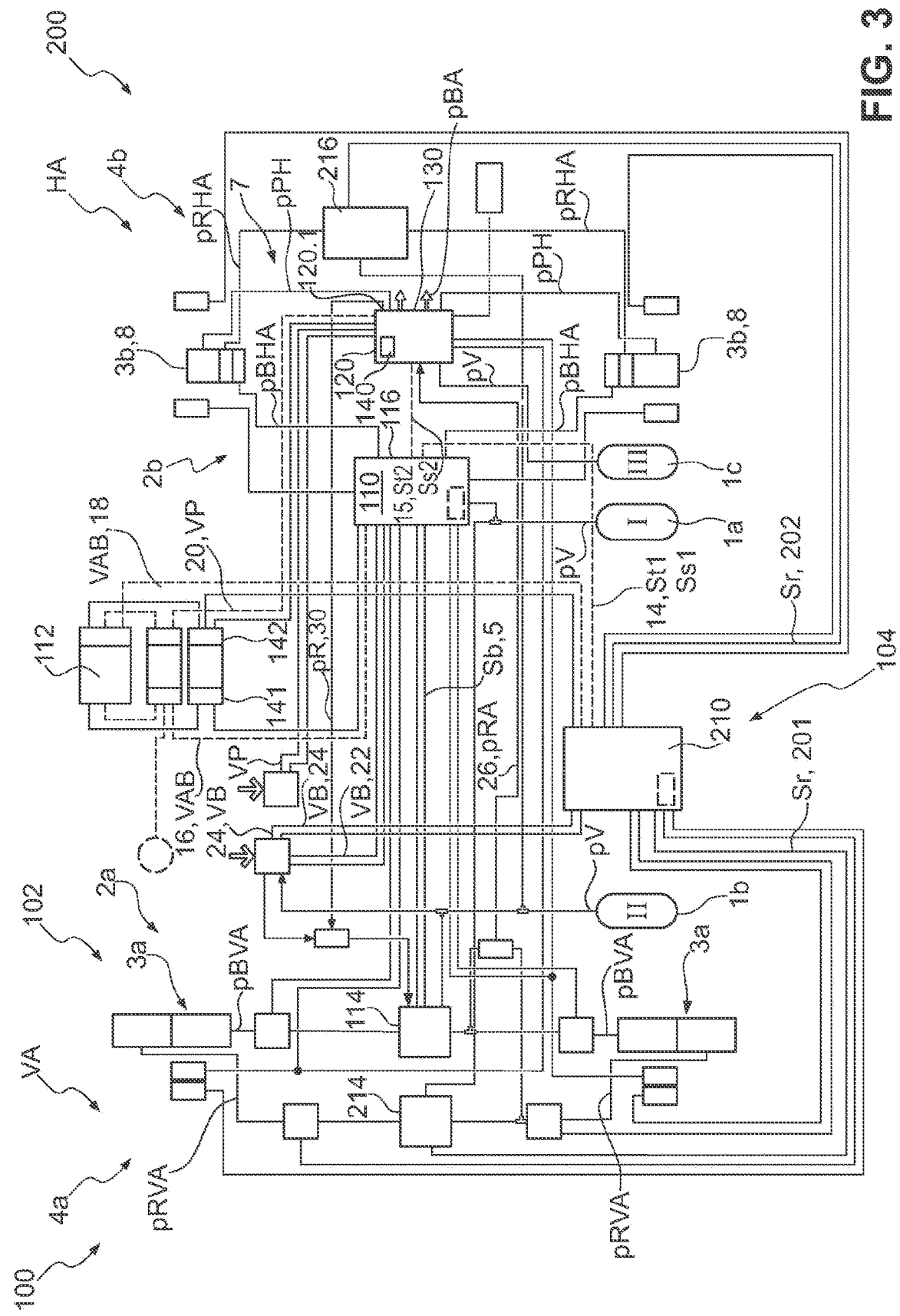
FIG. 3 shows a third exemplary embodiment of an electronically controllable braking system.

In a third exemplary embodiment (as depicted in FIG. 3), a braking system 100 which is based on the second exemplary embodiment (as depicted in FIG. 2) is shown. Identical and similar elements are again denoted by the same reference designations, such that reference is made to the above description relating to the first and second embodiment in its entirety. In the following, the differences between the first and second exemplary embodiment will be highlighted in particular.

The fundamental difference in the third exemplary embodiment relative to the second exemplary embodiment lies in the fact that the first compressed air reservoir 1*a* is connected to the rear axle service brake circuit 2*b* and to the front axle redundancy brake circuit 4*a*. In the same manner, the second compressed air reservoir 1*b* is connected to the front axle service brake circuit 2*a* and to the rear axle redundancy brake circuit 4*b*. This means that the first compressed air reservoir 1*a* provides supply pressure pV both to the service brake control module 110 and to the service front axle modulator 214. In the same manner, the second compressed air reservoir 1*b* provides supply pressure pV to the service front axle modulator 114 and to the redundancy rear axle modulator 216.

Figure 4:
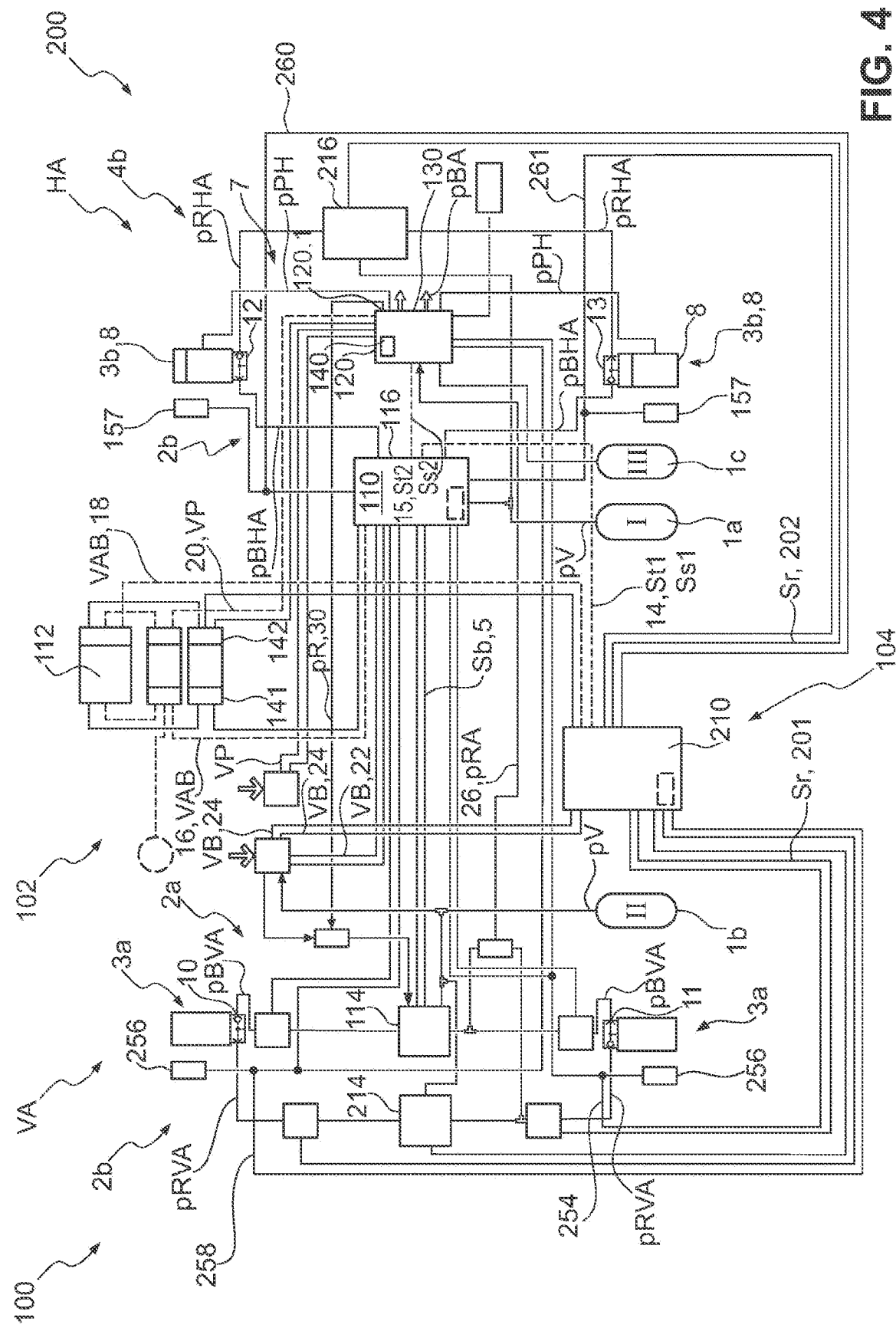
FIG. 4 shows a fourth exemplary embodiment of an electronically controllable braking system.

FIG. 4 shows a fourth exemplary embodiment, which is based in principle on the first exemplary embodiment. In this respect, the first, second, third and fourth shuttle valves 10, 11, 12, 13 are again provided for the corresponding front axle service brakes 3*a* and rear axle service brakes 3*b*.

Unlike in the first exemplary embodiment (as depicted in FIG. 1), however, in this exemplary embodiment (as depicted in FIG. 4) no redundant front axle wheel sensors 256 and redundant rear axle wheel sensors 257 are provided. The braking system 100 has only the front axle wheel sensors 156 and rear axle wheel sensors 157. However, in order to supply the redundancy brake sub-system 104 with wheel speed information, the redundancy brake control module 210 acquires this information from the front axle and rear axle wheel sensors 156, 157 via first and second electrical front axle wheel speed lines 258, 259 and first and second rear axle wheel speed lines 260, 261. Accordingly, there is only redundant cabling and not a redundant expansion stage including redundant sensors.

Figure 5:
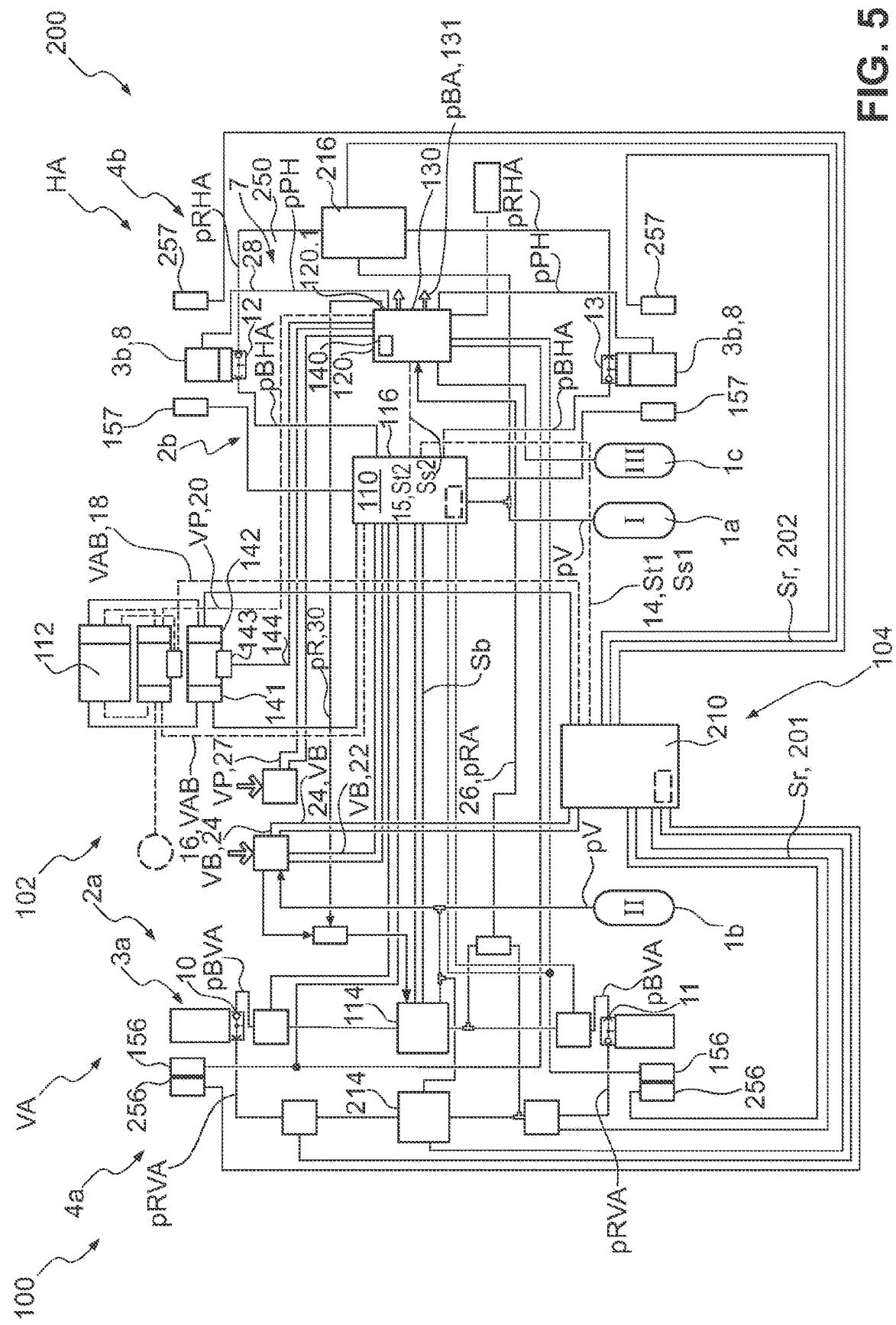
FIG. 5 shows a fifth exemplary embodiment of an electronically controllable braking system.

The fifth exemplary embodiment (as depicted in FIG. 5) is again based on the first exemplary embodiment. Unlike in the first exemplary embodiment, a third power source 143 is provided in the fifth exemplary embodiment. The third power source 143 is connected via a third power line 144 to the parking brake module 120. In this exemplary embodiment, the parking brake module 120 is again integrated with the trailer control module 130, so that this integrated module is supplied by the third power source 143. The second power source 142 supplies only the redundancy control module 210 and optionally the associated brake signal transmitter BST.

Figure 7:
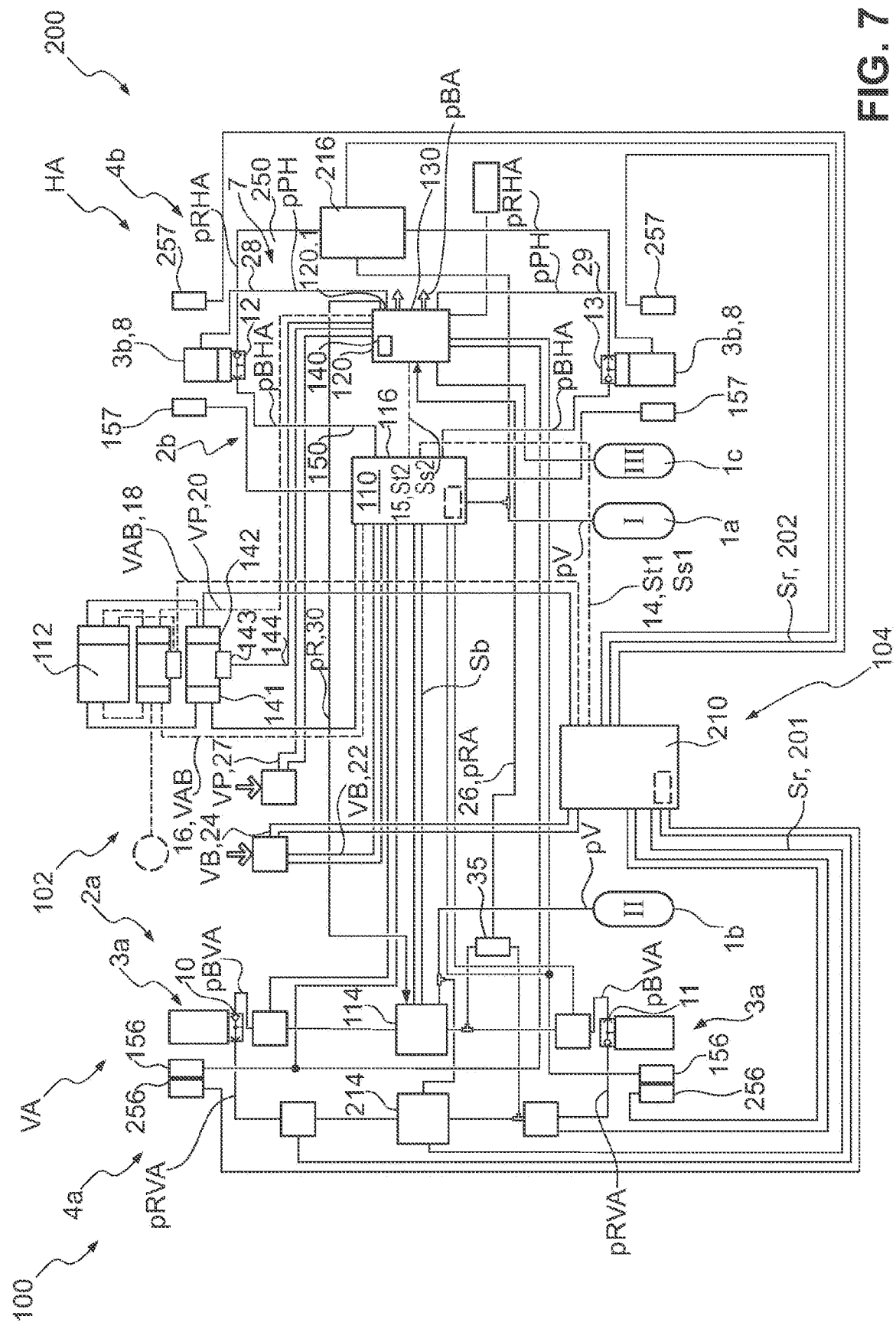
FIG. 7 shows a sixth exemplary embodiment of an electronically controllable braking system.

The sixth exemplary embodiment (as depicted in FIG. 7) differs from the first exemplary embodiment (as depicted in FIG. 1) in that the brake signal transmitter BST is not in pneumatically redundant form. The brake signal transmitter BST is electrically connected solely via the first brake signal transmitter line 22 and the second brake signal transmitter line 24 to the service brake control module 110 and the redundancy brake control module 210. However, the brake signal transmitter BST is not connected either to the second compressed air reservoir 1*b* or to the second redundancy line 33. In this respect, the first redundancy pressure line 30 is connected directly to the service front axle modulator 114 in order to output the redundancy pressure pR at the service front axle modulator. Manual, pneumatically redundant control is not provided in this braking system 100 according to the sixth embodiment.

Figure 8:
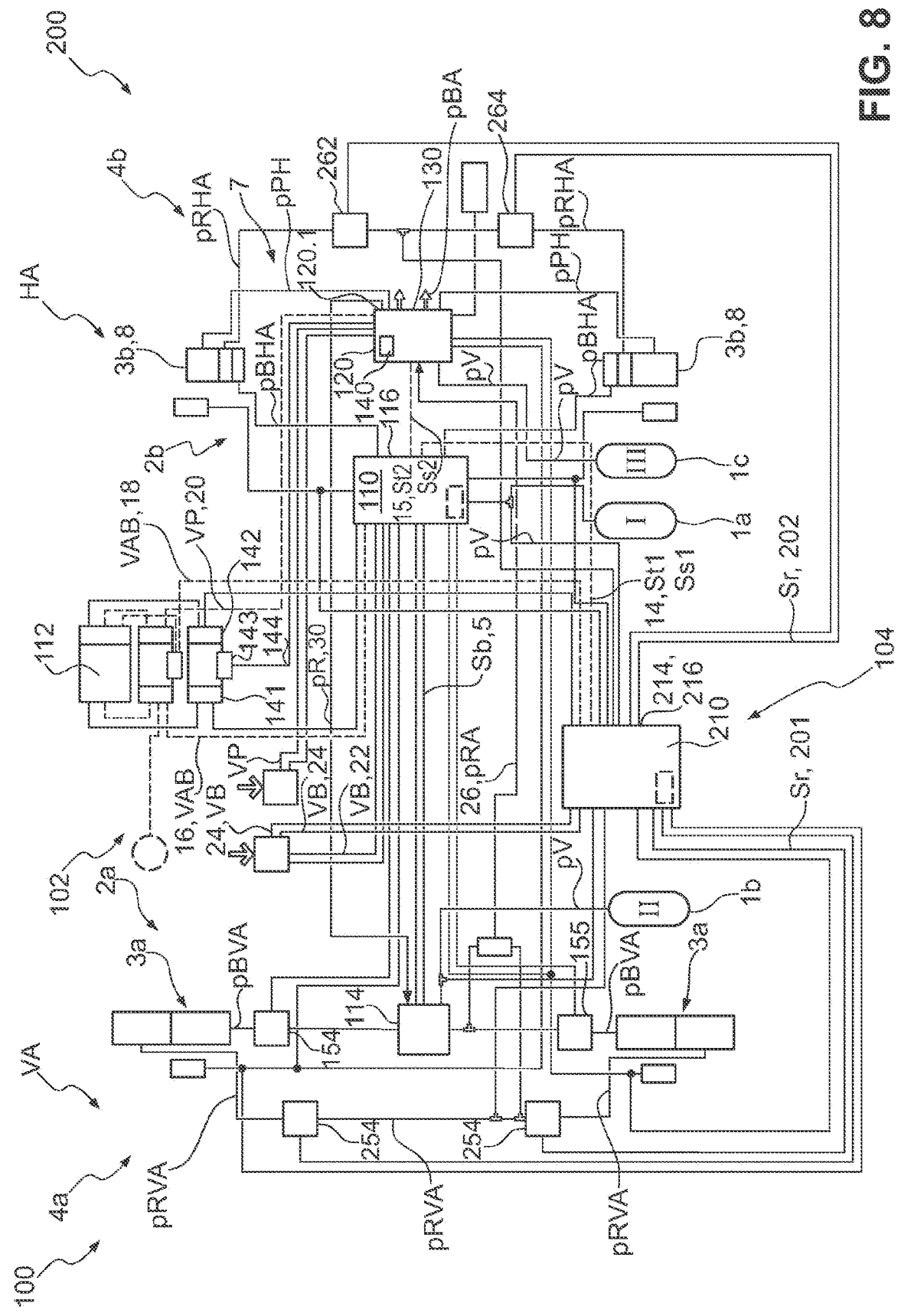
FIG. 8 shows a seventh exemplary embodiment of an electronically controllable braking system.

The seventh exemplary embodiment (as depicted in FIG. 8) is again based on the second exemplary embodiment, wherein in this exemplary embodiment (as depicted in FIG. 8) the redundancy brake control unit 210 is not purely electric but electro-pneumatic in form. More specifically, the first compressed air reservoir 1*a*, as already shown in the second exemplary embodiment, is connected to the service brake control module 110. On the other hand, the first compressed air reservoir 1*a* is also connected to the redundancy brake control module 210, which outputs the supply pressure pV from the first compressed air reservoir 1*a* at the front axle VA. In this exemplary embodiment, the front axle VA also does not have a redundancy front axle modulator 214, this is integrated into the redundancy brake control unit 210. The redundancy brake control unit 210 thus outputs the redundant front axle brake pressure pRVA, which is fed from the first compressed air reservoir 1*a*, directly.

In the same manner, the second compressed air reservoir 1*b* is connected on the one hand to the service front axle modulator 114 and on the other hand to the redundancy brake control module 210. In the seventh exemplary embodiment (as depicted in FIG. 8), the braking system 100 also does not have a redundancy rear axle modulator 216; rather, this is integrated into the redundancy brake control module 210. The redundancy brake control module 210, with the aid of the second compressed air reservoir 1b, then outputs the redundant rear axle brake pressure pRHA directly at the rear axle HA. In the seventh exemplary embodiment, first and second redundant rear axle ABS modules 262, 264 are additionally provided, in order to allocate the rear axle redundancy pressure pRHA outputted by the redundancy brake control module 210 in a manner suitable for the wheels to the left and right sides of the vehicle 200.

While the embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the embodiments refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS (PART OF THE DESCRIPTION)

1a first compressed air reservoir
1b second compressed air reservoir
1c third compressed air reservoir
2a front axle service brake circuit
2b rear axle service brake circuit
3a front axle service brakes
3b rear axle service brakes
4a front axle redundancy brake circuit
4b rear axle redundancy brake circuit
5 first electrical line
7 parking brake circuit
8 Spring brakes
10 first shuttle valve
11 second shuttle valve
12 third shuttle valve
13 fourth shuttle valve
14 first status line
15 second status line
16 first vehicle BUS
18 second vehicle BUS
20 third vehicle BUS
22 first brake signal transmitter line
24 second brake signal transmitter line
26 trailer redundancy pressure line
27 parking brake switch line
28 first spring brake pressure line
29 second spring brake pressure line
30 first redundancy pressure line
32 first select high valve
33 second redundancy pressure line
34 third redundancy pressure line
35 second select high valve
100 electronically controllable braking system
102 service brake sub-system
104 redundancy brake sub-system
110 service brake control module
112 unit for autonomous driving
114 service front axle modulator
116 service rear axle modulator
118 first ABS valve
119 second ABS valve
120 parking brake module
120.1 redundancy output
120.2 spring brake ports
130 trailer control module
130.1 trailer redundancy port
131 trailer brake pressure port
132 trailer supply pressure port
140 inverter control valve
141 first power source
142 second power source
143 third power source
144 third power line
150 first rear axle service brake line
151 second rear axle service brake line
152 first front axle service brake line
153 second front axle service brake line
154 first front axle ABS module
155 second front axle ABS module
156 front axle wheel sensors
157 rear axle wheel sensors
200 vehicle, commercial vehicle
201 second electrical line
210 redundancy brake control module
214 redundancy front axle modulator
216 redundancy rear axle modulator
218 first redundant ABS valve
219 second redundant ABS valve
250 first rear axle redundancy brake line
251 second rear axle redundancy brake line
252 first front axle redundancy brake line
253 second front axle redundancy brake line
254 first redundant front axle ABS module
255 second redundant front axle ABS module
256 redundant front axle wheel sensors
257 redundant rear axle wheel sensors
258 first front axle wheel speed line
259 second front axle wheel speed line
260 first rear axle wheel speed line
261 second rear axle wheel speed line
400 twin brake cylinder
402 front axle service brake cylinder (service brake cylinder)
403 front axle service brake cylinder
404 redundant front axle brake cylinder
405 redundant rear axle brake cylinder HCU parking brake switch
VA front axle
HA rear axle
pBA trailer brake pressure
pBVA front axle service brake pressure
pBHA rear axle service brake pressure
pRVA front axle redundancy brake pressure
pRHA rear axle redundancy brake pressure
pPH parking brake pressure
pR redundant control pressure
pRA trailer redundancy pressure
pRM manually outputted redundancy pressure
VAB assistance braking specification
VB service brake braking specification
VP parking brake braking specification
Sb service brake control signal
Sr redundancy brake control signal
St1 first timeout signal
St2 second timeout signal
zSoll target vehicle deceleration

The invention claimed is:

1. An electronically controllable braking system for a vehicle, comprising:
a service brake sub-system including:
a front axle service brake circuit with front axle service brakes,
a rear axle service brake circuit with rear axle service brakes, and
a service brake control module, wherein the service brake control module is configured to generate a service brake control signal in dependence upon a braking specification, wherein a front axle service brake pressure supplied to the front axle service brakes and a rear axle service brake pressure supplied to the rear axle service brakes can beare generated in dependence upon the service brake control signal under the electrical control of the service brake control module; and
a redundancy brake sub-system including:
a front axle redundancy brake circuit,
a rear axle redundancy brake circuit, and
a redundancy brake control module, wherein the redundancy brake control module is configured to generate a redundancy brake control signal in dependence upon a braking specification, wherein a front axle redundancy brake pressure supplied to the front axle service brakes and a rear axle redundancy brake pressure supplied to the rear axle service brakes are generated in dependence upon the redundancy brake control signal under the electrical control of the redundancy brake control module.

2. A method for controlling an electronically controllable braking system as claimed in claim 1, the method comprising:
determining whether the braking specification can be implemented via at least one of the front axle service brake circuit or the rear axle service brake circuit under the electrical control of the service brake control module;
responsive to determining that implementation of the braking specification via the at least one of the front axle service brake circuit or the rear axle service brake circuit under the electrical control of the service brake control module is prevented:
determining whether the braking specification can be implemented via at least one of the front axle redundancy brake circuit or the rear axle redundancy brake circuit under the electrical control of the redundancy brake control module; and
responsive to determining that implementation of the braking specification via the at least one of the front axle redundancy brake circuit or the rear axle redundancy brake circuit under the electrical control of the redundancy brake control module is not prevented:
outputting the front axle redundancy brake pressure and/or the rear axle redundancy brake pressure, in dependence upon the redundancy brake control signal generated by the redundancy brake control module, to the front axle service brakes and the rear axle service brakes for the implementation of the braking specification via the front axle redundancy brake circuit and/or the rear axle redundancy brake circuit.

3. The method as claimed in claim 2, comprising:
providing a first status signal by the service brake control module to the redundancy brake control module;
and responsive to determining that an electrically controlled implementation of the braking specification via the front axle service brake circuit and/or the rear axle service brake circuit is prevented by the service brake control module:
providing a first fault signal by the service brake control module, and
receiving the first fault signal at the redundancy brake control module.

4. The method as claimed in claim 2, comprising:
receiving the assistance braking specification at the service brake control module via a first vehicle BUS from thea unit for autonomous driving; and
receiving the assistance braking specification at the redundancy brake control module via a second vehicle BUS from the a unit for autonomous driving.

5. The method as claimed in claim 2, comprising:
receiving a parking braking specification at a parking brake module and outputting a parking brake pressure;
receiving a second status signal at the parking brake module;
responsive to determining that an electrically controlled implementation of the braking specification via the front axle service brake circuit and/or the rear axle service brake circuit is prevented by the service brake control module:
providing a second fault signal by the service brake control module to the parking brake module; or
responsive to detecting a fault of the service brake control module in accordance with detecting that the second status signal is absent:
outputting a redundant control pressure for the front axle service brake circuit and/or the front axle redundancy brake circuit by the parking brake module in dependence upon the detected fault.

6. The method as claimed in claim 2, comprising:
outputting a trailer brake pressure by a trailer control module;
receiving a second status signal at the trailer control module;
responsive to determining that an electrically controlled implementation of the braking specification via the front axle service brake circuit and/or the rear axle service brake circuit is prevented by the service brake control module:
providing a second fault signal by the service brake control module to the trailer control module; or responsive to detecting a fault of the service brake control module in accordance with detecting that the second status signal is absent;

outputting a redundant control pressure for the front axle service brake circuit and/or the front axle redundancy brake circuit by the parking brake module in dependence upon the detected fault.

7. The method as claimed in claim 2, comprising:

receiving a higher of the front axle service brake pressure and the front axle redundancy brake pressure as a trailer redundancy pressure via a trailer redundancy pressure line at a trailer control module; and outputting the trailer redundancy pressure as a trailer brake pressure.

8. The electronically controllable braking system as claimed in claim 1, further comprising:

a parking brake circuit including spring brakes, wherein a parking-brake brake pressure is generated in dependence upon the braking specification and supplied to the spring brakes via the parking brake circuit.

9. The electronically controllable braking system as claimed in claim 8, further comprising a parking brake module configured to control the parking brake circuit, wherein the parking brake module outputs the parking brake pressure in dependence upon a parking brake braking specification.

10. The electronically controllable braking system as claimed in claim 9, wherein:

the service brake control module and the parking brake module are connected via a second status line, and the parking brake module is adapted to receive a second fault signal from the service brake control module via the second status line and/or is adapted to detect a fault responsive to detecting that the first status signal is absent; and wherein the parking brake module is configured, in dependence upon the receiving of the second fault signal and/or the absence of the first status signal, to provide a redundant control pressure for the front axle service brake circuit and/or the front axle redundancy brake circuit.

11. The electronically controllable braking system as claimed in claim 10, wherein the parking brake module further includes an inverter control valve with a redundancy output, wherein the inverter control valve is configured to generate a redundant control pressure and to output the redundant control pressure via the redundancy output, wherein the redundant control pressure is inversely proportional to the parking-brake brake pressure, wherein the front axle service brake pressure is outputted to the front axle service brakes in dependence upon the redundant control pressure specified by the inverter control valve.

12. The electronically controllable braking system as claimed in claim 8, wherein the parking brake circuit is connected to a third compressed air reservoir.

13. The electronically controllable braking system as claimed in claim 1, further comprising a trailer control module that is configured to output a trailer brake pressure.

14. The electronically controllable braking system as claimed in claim 13, wherein:

the service brake control module and the trailer control module are connected via a second status line for transmitting a second status signal, and the trailer control module is adapted to receive a second fault signal from the service brake control module via the second status line and/or is adapted to detect a fault responsive to detecting that the second status signal is absent; and wherein the trailer control module is configured, in dependence upon the receiving of the second fault signal and/or the absence of the second status signal, to provide a redundant control pressure for the front axle service brake circuit and/or the front axle redundancy brake circuit.

15. The electronically controllable braking system as claimed in claims 14, wherein the parking brake module and the trailer control module are integrated in a common first integrated module.

16. The electronically controllable braking system as claimed in claim 14, wherein the trailer control module is connected to a trailer redundancy pressure line into which the higher of the front axle service brake pressure and the front axle redundancy brake pressure is output as the trailer redundancy pressure, wherein the trailer control module is configured, in dependence upon the receiving of the second fault signal and/or in the absence of the second status signal, to output the trailer redundancy pressure as the trailer brake pressure.

17. The electronically controllable braking system as claimed in claim 1, wherein:

the service brake sub-system further includes a service front axle modulator, connected to the service brake control module, and a service rear axle modulator, connected to the service brake control module, the service front axle modulator and the service rear axle modulator are configured to receive the service brake control signal and to output the front axle service brake pressure or the rear axle service brake pressure; and wherein:

the redundancy brake sub-system has-further includes a redundancy front axle modulator, connected to the redundancy brake control module, and a redundancy rear axle modulator, connected to the redundancy brake control module, the redundancy front axle modulator and the redundancy rear axle modulator are configured to receive the redundancy brake control signal and to output the front axle redundancy brake pressure or the rear axle redundancy brake pressure.

18. The electronically controllable braking system as claimed in claim 17, wherein:

the service brake sub-system includes a first antilock braking system (ABS) valve and a second ABS valves, wherein the first ABS valve and the second ABS valve are arranged between the service front axle modulator and the corresponding front axle service brake; and the redundancy brake sub-system includes a first redundant ABS valve and a second redundant ABS valves, wherein the first redundant ABS valve and the second redundant ABS valve are arranged between the redundancy front axle modulator and the corresponding front axle service brake.

19. The electronically controllable braking system as claimed in claim 1, comprising a first power source, a second power source and a third power source, wherein the first power source is connected to the service brake control module, the second power source is connected to the redundancy brake control module, and the third power source is connected to a parking brake module and/or to a trailer control module.

20. A vehicle having an electronically controllable braking system as claimed in claim 1.

21. The electronically controllable braking system as claimed in claim 1, wherein:
- the rear axle service brake circuit and the rear axle redundancy brake circuit are connected to a first compressed air reservoir, and the front axle service brake circuit and the front axle redundancy brake circuit are connected to a second compressed air reservoir; or
- the rear axle service brake circuit and the front axle redundancy brake circuit are connected to a first compressed air reservoir, and the front axle service brake circuit and the rear axle redundancy brake circuit are connected to a second compressed air reservoir.

22. The electronically controllable braking system as claimed in claim 1, wherein:
- the front axle service brake circuit and the front axle redundancy brake circuit are connected via a first shuttle valve and a second shuttle valves to the corresponding front axle service brakes, such that in a higher of the front axle service brake pressure and the front axle redundancy brake pressure is outputted to the front axle service brakes; and
- the rear axle service brake circuit and the rear axle redundancy brake circuit are connected via a third shuttle valve and a fourth shuttle valves to the corresponding rear axle service brakes, such that the higher of the rear axle service brake pressure and the rear axle redundancy brake pressure is output to the rear axle service brakes.

23. The electronically controllable braking system as claimed in claim 1, wherein the front axle service brakes include a front axle service brake cylinder and a redundant front axle brake cylinder, wherein the front axle service brake circuit is connected to the front axle service brake cylinder and the front axle redundancy brake circuit is connected to the redundant front axle brake cylinder, and/or the rear axle service brakes include a rear axle service brake cylinder and a redundant rear axle brake cylinder, wherein the rear axle service brake circuit is connected to the rear axle service brake cylinder and the rear axle redundancy brake circuit is connected to the redundant rear axle brake cylinder.

24. The electronically controllable braking system as claimed in claim 1, wherein the service brake control module and the redundancy brake control module are connected to one another via a first status line for transmitting a first status signal, and the redundancy brake control module is adapted to receive a first fault signal from the service brake control module via the first status line and/or is adapted to detect a fault responsive to detecting that the first status signal is absent.

25. The electronically controllable brake system as claimed in claim 1, wherein the service brake control module is connected via a first vehicle BUS to a unit for autonomous driving, and the redundancy brake control module is connected via a second vehicle BUS to the unit for autonomous driving.

26. The electronically controllable braking system as claimed in claim 1, further comprising a brake signal transmitter, wherein the brake signal transmitter is connected by a first brake signal transmitter line to the service brake control module and by a second brake signal transmitter line to the redundancy brake control module.

* * * * *